United States Patent
Christensen (10) Patent No.: US 12,506,167 B2
(45) Date of Patent: Dec. 23, 2025

(54) REVERSIBLE SHUNTS FOR OVERCHARGE PROTECTION IN POLYMER ELECTROLYTE MEMBRANE FUEL CELLS

(71) Applicant: Robert Bosch GmbH, Stuttgart (DE)

(72) Inventor: Jake Christensen, Elk Grove, CA (US)

(73) Assignee: Robert Bosch GmbH, Stuttgart (DE)

( * ) Notice: Subject to any disclaimer, the term of this patent is extended or adjusted under 35 U.S.C. 154(b) by 345 days.

(21) Appl. No.: 18/051,645

(22) Filed: Nov. 1, 2022

(65) Prior Publication Data

US 2023/0112131 A1    Apr. 13, 2023

Related U.S. Application Data

(63) Continuation-in-part of application No. 16/867,848, filed on May 6, 2020, now Pat. No. 11,515,555.

(51) Int. Cl.
| | | |
|---|---|---|
| *H01M 8/1046* | (2016.01) | |
| *H01M 8/10* | (2016.01) | |
| *H01M 8/1039* | (2016.01) | |
| *H01M 8/1067* | (2016.01) | |

(52) U.S. Cl.
CPC ....... *H01M 8/1046* (2013.01); *H01M 8/1039* (2013.01); *H01M 8/1067* (2013.01); *H01M 2008/1095* (2013.01)

(58) Field of Classification Search
CPC ............. H01M 8/1046; H01M 8/1039; H01M 8/1067; H01M 2008/1095; H01M 8/0234; H01M 8/0245; H01M 8/1004; H01M 8/1023; H01M 8/1032; H01M 8/1053; Y02E 60/50

See application file for complete search history.

(56) References Cited

U.S. PATENT DOCUMENTS

| | | |
|---|---|---|
| 6,074,776 A | 6/2000 | Mao et al. |
| 6,228,516 B1 | 5/2001 | Denton et al. |
| 7,498,097 B2 | 3/2009 | Ueda et al. |
| 8,350,519 B2 | 1/2013 | Brantner et al. |
| 8,373,381 B2 | 2/2013 | Raiser et al. |
| 2004/0109816 A1 | 6/2004 | Srinivas et al. |
| 2004/0169165 A1 | 9/2004 | Srinivas |
| 2014/0370414 A1 | 12/2014 | Schulz |
| 2015/0171398 A1 | 6/2015 | Roumi |
| 2016/0141896 A1 | 5/2016 | Brandon et al. |

OTHER PUBLICATIONS

Thomas-Alyea et al., Modeling the Behavior of Electroactive Polymers for Overcharge Protection of Lithium Batteries, 2004, J. Electrochem. Soc., 151, A509-A521 (Year: 2004).*

(Continued)

*Primary Examiner* — Daniel S Gatewood
(74) *Attorney, Agent, or Firm* — BROOKS KUSHMAN P.C.

(57) ABSTRACT

An electrochemical cell includes a fuel source; an oxidation source; a positive electrode exposed to an electrolyte membrane; a negative electrode exposed to the electrolyte membrane; and the electrolyte membrane positioned between the positive and negative electrodes, the electrolyte membrane including an electron donor material and a shunt material having specific volume percentage of one or more carbon-containing semiconductors that become electronically conductive at a specific shunting onset potential below the cell's open circuit potential.

20 Claims, 6 Drawing Sheets

(56) References Cited

OTHER PUBLICATIONS

Chen et al., Overcharge Protection for Rechargeable Lithium Batteries Using Electroactive Polymers, 2004, Electrochemical Solid-State Letters, 7, A23-A26 (Year: 2004).*
Mandal et al., "Understanding the voltage reversal behavior of automotive fuel cells," J. Power Sources 397:397-404 (2018).
Tazi and Savadogo, "Parameters of PEM fuel-cells based on new membranes fabricated from Nafion, silicotungstic acid and thiophene," Electrochemica Acta 45 (25-26); 4326-4339 (2000).

* cited by examiner

REVERSIBLE SHUNTS FOR OVERCHARGE PROTECTION IN POLYMER ELECTROLYTE MEMBRANE FUEL CELLS

CROSS-REFERENCE TO RELATED APPLICATIONS

This application is a continuation-in-part of U.S. application Ser. No. 16/867,848 filed May 6, 2020, now U.S. Pat. No. 11,515,555, issued Nov. 29, 2022, published as U.S. Patent Application Publication US 2021/0351426, the disclosure of which is hereby incorporated in its entirety by reference herein.

TECHNICAL FIELD

Described herein is an electrochemical cell such as a polymer-electrolyte-membrane fuel cell (PEMFC) that incorporates a shunt into the membrane separator that becomes electronically conductive around a well-defined anodic onset potential, thereby preventing excessive anodic potentials at the positive electrode that would otherwise drive deleterious parasitic reactions such as catalyst dissolution or catalyst and carbon oxidation.

BACKGROUND

Figure 1:
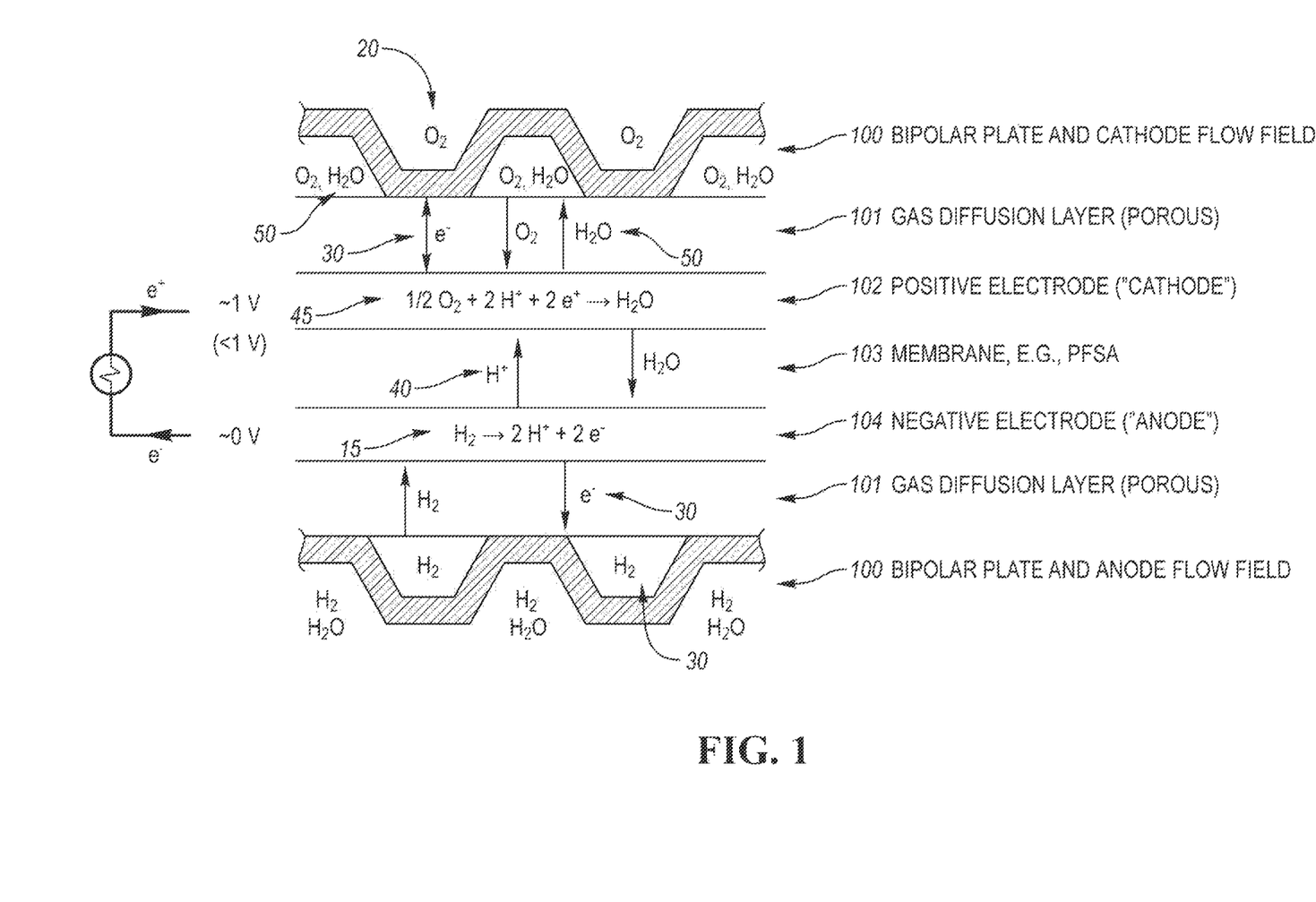
FIG. 1 shows a polymer-electrolyte-membrane fuel cell (PEMFC) with associated chemical reactions under normal operating conditions.

A fuel cell (FC) is a device that converts energy of a chemical reaction into electrical energy (electrochemical device) without combustion. A polymer-electrolyte-membrane fuel cell (PEMFC; see FIG. 1) generally comprises an anode 104, a cathode 102, a polymer electrolyte membrane (PEM) 103, gas diffusion layers 101, and flow fields/current collectors (bipolar plate and flow field) 100. During normal operation, hydrogen gas 10 is oxidized and converted to protons 40 yielding two electrons 30 at the anode 104. At the cathode, oxygen 20 combines with the protons 40 and electrons to yield water 50. Protons 40 and water 50 can traverse the PEM 103, while gas ($O_2$ at cathode and $H_2$ at anode) are supplied to the electrodes from the flow fields via the gas diffusion layers (GDLs), and water is transported out via the GDLs and subsequently the flow fields. The oxidation and reduction reactions occurring within the fuel cell are shown below. The equilibrium potentials in each case are given with respect to the standard hydrogen electrode.

$$E° = 0 \text{ V} \quad \frac{dE°}{dT} = 0 \text{ mV } K^{-1};$$

$$E° = 1.2291 \text{ V} \quad \frac{dE°}{dT} = -0.8456 \text{ mV } K^{-1}$$

The overall reaction is:

$$E° = 1.2291 \text{ V} \quad \frac{dE°}{dT} = -0 \text{ } mVK^{-1}$$

This electrochemical process is a non-combustion process that does not generate airborne pollutants. Therefore, fuel cells are a clean, zero emission, highly efficient source of energy. Fuel cells can have 2-3 times greater efficiency than internal combustion engines and can use abundant or renewable fuels. Fuel cells produce electricity, water, and heat using fuel ($H_2$) 10 and oxygen 20. Water 50 (liquid and vapor) is the only emission when hydrogen 10 is the fuel.

The two half-reactions (15 and 45) normally occur very slowly at the low operating temperature of the fuel cell, and catalysts are used on one or both the anode 104 and cathode 102 to increase the rates of each half reaction. Platinum (Pt) is the typical metal catalyst because it can generate high rates of $O_2$ reduction at the relatively low temperatures of the PEM fuel cells. Kinetic performance of PEM fuel cells is limited primarily by the slow rate of the $O_2$ reduction half reaction (cathode reaction, 45) which is typically more than 100 times slower than the $H_2$ oxidation half reaction (anode reaction, 15). The $O_2$ reduction half reaction is also limited by mass transfer issues.

In operation, the output voltage of an individual fuel cell under load is generally below one volt. Therefore, in order to provide greater output voltage, multiple fuel cells are usually stacked together and are connected in series to create a higher voltage fuel cell stack. Fuel cell stacks can then be further connected in series or parallel combinations to form larger arrays for delivering higher voltages or currents.

As fuel, such as hydrogen 40, flows into a fuel cell on the anode 104 side, a catalyst facilitates the separation of the hydrogen gas fuel into electrons and protons (hydrogen ions). The hydrogen ions pass through the membrane 103 (center of fuel cell) and, again with the help of the catalyst, combine with an oxidant, such as oxygen 20, and electrons 30 on the cathode side, producing water 50. The electrons 30, which cannot pass through the membrane 103, flow from the anode 104 to the cathode 102 through an external circuit containing a motor or other electrical load, which consumes the power generated by the cell.

A catalyst is used to induce the desired electrochemical reactions at the electrodes. The catalyst is often incorporated at the electrode/electrolyte interface by coating a slurry of the electrocatalyst particles to the polymer electrolyte membrane 103 surface. When hydrogen fuel 10 feeds through the anode catalyst/electrolyte interface, electrochemical reaction occurs, generating protons 40 and electrons 30 (15). The electrically conductive anode 104 is connected to an external circuit, which carries electrons by producing electric current. The polymer electrolyte membrane 103 is typically a proton conductor, and protons 40 generated at the anode catalyst migrate through the polymer electrolyte membrane 103 to the cathode 102. At the cathode catalyst interface, the protons 40 combine with electrons 30 and oxygen 20 to yield water 50 (45).

The catalyst is typically a particulate metal such as platinum and is dispersed on a high surface area electronically conductive support. Such catalysts, particularly platinum, are very sensitive to carbon monoxide poisoning. This is a particular concern for the anode catalyst for fuel cells operating on hydrogen, as CO is sometimes present in the hydrogen supply as a fuel contaminant and/or as a result of membrane cross-over from the oxidant supply in applications where air is employed.

The electronically conductive support material in the PEMFC typically includes carbon particles. Carbon has an electrical conductivity (on the order of $10^{-2}$ to 1 S/cm, depending on the type) which helps facilitate the passage of electrons from the catalyst to the external circuit.

Proton conductive materials, such as perfluorosulfonic acid (PFSA) membranes (e.g., Nation®), are often added to facilitate transfer of the protons from the catalyst to the membrane interface.

To promote the formation and transfer of the protons and the electrons and to prevent drying out of the membrane 103, the fuel cells are operated under humidified conditions. To generate these conditions, hydrogen fuel 10 and/or oxygen 20 gases are sometimes humidified prior to entry into the fuel cell. In a supported electrocatalyst, carbon is relatively hydrophobic, and as such, the boundary contact between the reactive gases, water and the surface of the solid electrodes made of carbon contributes to high electrical contact resistance and ohmic power loss in the fuel cell resulting in lower efficiency of the fuel cell.

Voltage reversal occurs when a fuel cell in a series stack cannot generate sufficient current to keep up with the rest of the cells in the series stack. Several conditions can lead to voltage reversal in a PEM fuel cell, including insufficient oxidant, insufficient fuel, insufficient water, low or high cell temperatures, and problems with cell components or construction. Reversal generally occurs when one or more cells experience a more extreme level of one of these conditions compared to other cells in the stack. Undesirable electrochemical reactions may occur, which may detrimentally affect fuel cell components. Component degradation reduces the reliability and performance of the affected fuel cell, and in turn, its associated stack and array. Groups of cells within a stack can also undergo voltage reversal and even entire stacks can be driven into voltage reversal by other stacks in an array. Aside from the loss of power associated with one or more cells going into voltage reversal, this situation poses reliability concerns.

Voltage reversal also occurs upon $H_2$ depletion at the anode causing carbon corrosion on the anode; local depletion of $H_2$ at the anode, resulting in carbon corrosion on the cathode, water blockage or mass transport restrictions; and during a start/stop event causing a $H_2$ or air front on the anode resulting in carbon corrosion on the cathode. See Zhang et al., J. Power Sources 194: 588-600 (2009).

Reversal typically also results in excessive heat generation, which can induce pinholes in the membrane that lead to total cell (and possibly stack) failure. Methods to address voltage reversal, e.g., including oxygen evolution catalysts in the positive electrode to maintain voltages below the carbon corrosion potential and drive electrolysis of water, are ultimately insufficient. See e.g., Mandal et al., J. Power Sources 397: 397-404 (2018).

Figure 2A:
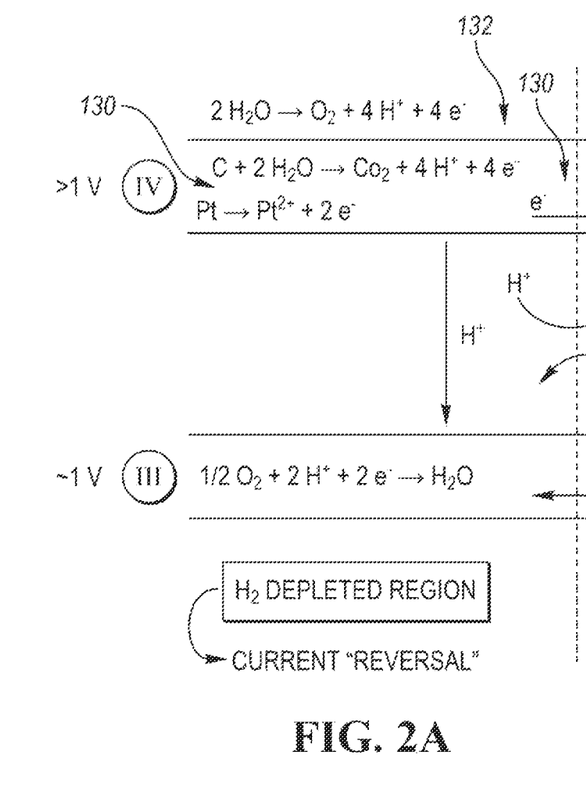
FIG. 2A shows a PEMFC at excessive anodic potentials and the corresponding corrosion that occurs during $H_2$ depletion in part of the negative electrode.
Figure 2B:
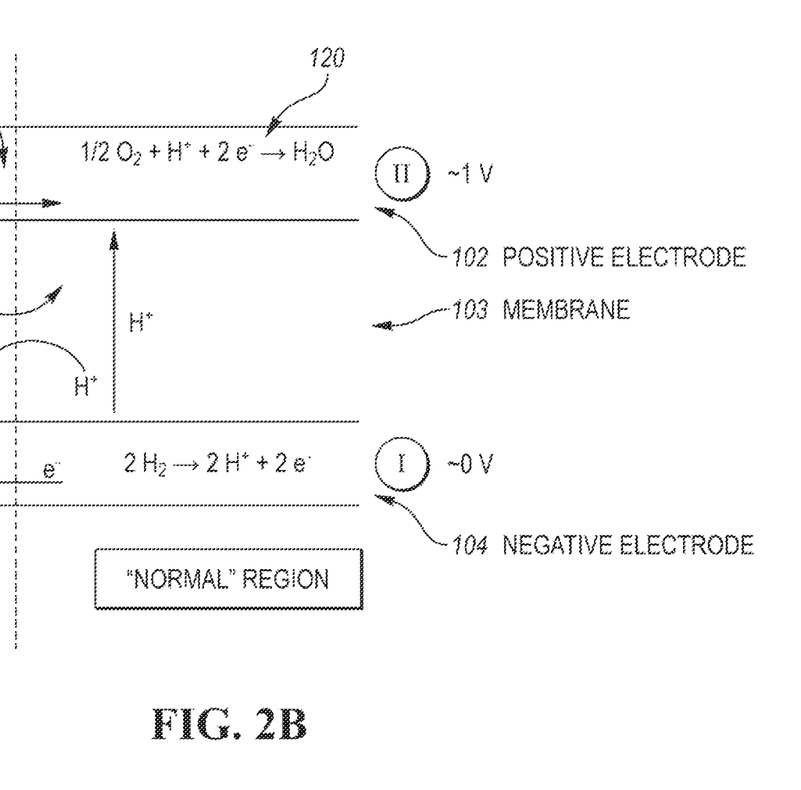
FIG. 2B shows the normal part of the fuel cell.

Regions of the negative electrode may become depleted of $H_2$ and corrosion results. See FIG. 2A. Near $H_2$ depleted regions of negative electrode, there is a tendency for $O_2$ reduction at the negative electrode due to the high cathodic overpotential (anode operating near $H_2$ potential) (III). This locally draws protons across the membrane from the positive electrode, which in turn drives the local generation of protons at the positive electrode in a reaction that may involve water or water and carbon (IV). The latter reaction occurs at a high potential, which may be observed if the local cell overpotential is high enough.

What is needed is a polymer-electrolyte-membrane fuel cell (PEMFC) that incorporates a shunt into the membrane separator that prevents excessive anodic potentials at the positive electrode.

SUMMARY

One embodiment described herein is a polymer-electrolyte-membrane fuel cell (PEMFC) system comprising: a fuel source; an oxidation source; a positive electrode exposed to an electrolyte membrane; a negative electrode exposed to the electrolyte membrane; and one or more electrolyte membranes being positioned between the positive electrode and the negative electrode; wherein the electrolytic membrane comprises one or more carbon-containing semiconductors that increase rapidly in conductivity around a potential which will be defined here as a "shunting onset potential." These semiconductors are positioned in the membrane such that, under certain environmental conditions, they will provide an electronically conductive path across the membrane. In one aspect, the fuel source comprises hydrogen ($H_2$).

In another aspect, the oxidation source comprises oxygen ($O_2$). In another aspect, the carbon-containing semiconductor comprises polyaniline, polypyrrole, polyfuran, thiophene, polythiophene, polyalkyl thiophene, polyacetylene, poly(9,9-dioctylfluorene-alt-benzothiadiazole), poly(phenylenevinylenes), PEDOT, PEDOT:PSS, linear acenes, metal phthalocyanines, perylene derivatives, tetrathiafulvalenes, benzothiophenes, coronenes, porphyrins, rubrenes, thiophenes, C60, graphene, graphene nanoribbons, purified semiconducting carbon nanotubes, or combinations or derivatives thereof. In another aspect, the carbon-containing semiconductor comprises one or more poly(3-alkyl) thiophenes.

In another aspect, the carbon-containing semiconductor comprises poly-3-butyl thiophene (P3BT). In another aspect, the electrolyte membrane comprises about 1% to about 50% of the carbon-containing semiconductor by volume of the membrane. In another aspect, the electrolyte membrane comprises about 0% to about 2%, about 1% to about 5%, about 5% to about 10%, about 10% to about 20%, about 20% to about 30%, about 30% to about 40%, about 40% to about 50%, about 1% to about 20%, about 5% to about 30%, about 10% to about 40%, about 20% to about 50%, about 30% to about 50%, about 1% to about 25%, or about 25% to about 50% of the carbon-containing semiconductor by volume of the membrane. In another aspect, the electrolyte membrane comprises about 5% to about 20% of the carbon-containing semiconductor by volume of the membrane.

In another aspect, the electrolyte membrane comprises a first volume percent of the carbon-containing semiconductor at a first region of the fuel cell and a second volume percent of the carbon-containing semiconductor at second region of the fuel cell. In another aspect, the electrolyte membrane comprises a poly(perfluorosulfonic) acid membrane or a sulfonated polybenzimidazole membrane. In another aspect, the electrolyte membrane comprises a sulfonated tetrafluoroethylene copolymer membrane.

In another aspect, the carbon-containing semiconductor becomes electronically conductive at a potential below the PEMFC's open circuit potential. In another aspect, the carbon-containing semiconductor becomes reversibly oxidized in the range of −0.01 to about 1.4 V vs. a standard hydrogen electrode (SHE). In another aspect, the shunting onset potential comprises a voltage of about 0.8 to about 2.0 vs. a standard hydrogen electrode (SHE). In another aspect, the shunting onset potential comprises a voltage of greater than about 0.90 V vs. a standard hydrogen electrode (SHE).

In another aspect, the carbon-containing semiconductor has a conductivity of about $1 \times 10^{-3}$ S/cm to about $1 \times 10^{-1}$ S/cm at a potential above the shunting onset potential. In another aspect, the carbon-containing semiconductor limits the potential of the positive electrode to a voltage lower than 1.5 V vs. a standard hydrogen electrode (SHE). In another aspect, the electrolyte membrane comprises a bilayer comprising a first carbon-containing semiconductor in a first layer and a second carbon-containing semiconductor in a second layer.

In another aspect, the first and second carbon-containing semiconductors have different or overlapping shunting onset potentials.

In another aspect, the electrolyte membrane comprises a plurality of layers, each layer comprising one or more carbon-containing semiconductors having different or overlapping shunting onset potentials. In another aspect, each layer of the electrolyte membrane comprises the same, different, or combinations thereof of volume percentages of one or more carbon-containing semiconductors.

Another embodiment described herein is a method for preventing current reversal or electrode overpotential in a polymer-electrolyte-membrane fuel cell (PEMFC) system, the method comprising incorporating into one or more electrolyte membranes one or more carbon-containing semiconductors that become electronically conductive at a specific onset potential. In one aspect, their shunting onset potential comprises about 0.9 V vs. a standard hydrogen electrode (SHE).

Another embodiment described herein is a means for preventing current reversal or cathode overpotential in a polymer-electrolyte-membrane fuel cell (PEMFC) system comprising incorporating into one or more electrolyte membranes one or more carbon-containing semiconductors that become electronically conductive at a specific onset potential. In one aspect, their shunting onset potential comprises about 0.9 V vs. a standard hydrogen electrode (SHE).

Another embodiment described herein is a polymer-electrolyte-membrane fuel cell (PEMFC) system comprising: a $H_2$ (g) fuel source; an $O_2$ (g) source; a positive electrode exposed to an electrolyte; a negative electrode exposed to an electrolyte; and one or more electrolyte membranes comprising sulfonated tetrafluoroethylene copolymer being positioned between the positive electrode and the negative electrode; wherein the electrolyte membrane further comprises a specific volume percentage of one or more carbon-containing semiconductors that become electronically conductive at a shunting onset potential of greater than about 0.9 V vs. a standard hydrogen electrode (SHE).

In at least another embodiment, an electrochemical cell is disclosed. The cell includes a fuel source, an oxidation source, a positive electrode exposed to an electrolyte membrane, and a negative electrode exposed to the electrolyte membrane. The electrolyte membrane positioned between the positive and negative electrodes may include an electron donor material and a shunt material having specific volume percentage of one or more carbon-containing semiconductors that become electronically conductive at a specific shunting onset potential below the cell's open circuit potential. The shunt material may be distributed substantially evenly throughout the membrane. The shunt material may be blended within the electron donor material and form discrete islands in the electron donor material. The membrane may include one or more regions with an elevated concentration of the shunt material in comparison to a remainder of the membrane. The membrane may further include one or more regions which are free of the shunt material. The electron donor material may include sulfonated tetrafluoroethylene copolymer. The shunt material may include polyaniline, polypyrrole, polyfuran, thiophene, polythiophene, polyalkyl thiophene, polyacetylene, poly(9,9-dioctylfluorene-alt-benzothiadiazole), poly(phenylenevinylenes), PEDOT, PEDOT:PSS, linear acenes, metal phthalocyanines, perylene derivatives, tetrathiafulvalenes, benzothiophenes, coronenes, porphyrins, rubrenes, thiophenes, C60, graphene, graphene nanoribbons, purified semiconducting carbon nanotubes, or combinations or derivatives thereof. The specific shunting onset potential may be greater than about 0.9 V vs. a standard hydrogen electrode (SHE).

In another embodiment, an electrochemical cell is disclosed. The cell includes a cathode adjacent to a cathode flow field and an anode opposite the cathode and adjacent to an anode flow field. The one or more shunt regions may be ionically conductive material free. The one or more shunt regions may include an area aligned with exit of the cathode flow field. The one or more shunt regions may include an area facing one or more land regions of the cathode flow field. The one or more shunt regions may include an area aligned with the anode flow field entrance, exit, or both. The one or more shunt regions may include discrete islands of the shunt material surrounded by the ionically conductive material. The shunt material may include an area having a higher moisture content than at least one other region of the membrane.

In yet another embodiment, an electrochemical cell membrane electrode assembly (MEA) is disclosed. The MEA may include a membrane having an ionically conductive material and a shunt material having one or more carbon-containing semiconductors that become electronically conductive at a specific shunting onset potential below the cell's open circuit potential. The membrane may include one or more first regions and one or more second regions, the second regions having a higher shunt material concentration than the one or more first regions. The one or more second regions may include a membrane area aligned with a cathode flow field exit. The one or more second regions may include a membrane area facing a cathode land region. The one or more second regions may include a membrane area aligned with a flow field entrance, exit, or both. The one or more first regions may be shunt material free.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In this specification and in the claims, reference will be made to several terms which shall be defined to have the following meanings:

As used in the specification and the appended claims, the singular forms "a," "an," and "the" include plural referents unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" as used herein indicates that the subsequently described event or circumstance may or may not occur, and that the description includes instances where said event or circumstance occurs and instances where it does not.

"Effective amount" as used herein refers to a composition or property as provided herein is meant such amount as can perform the function of the composition or property for which an effective amount is expressed. The exact amount required often varies from process to process, depending on recognized variables such as the compositions employed, and the processing conditions observed. Thus, it is not possible to specify an exact "effective amount."

"Substituted conducting polymer" as used herein refers to any chemical variation to a conducting polymer that retains the functionalities of conductivity and hetero atoms. For example, poly-3-butyl-thiophene is a "substituted" polythiophene.

"Electrochemical cell" as used herein refers to a device or a system structured to generate electrical energy from the chemical reactions occurring in it (e.g. fuel cells), or use the electrical energy supplied to it to facilitate chemical reactions in it (e.g. electrolyzer). An electrochemical cell is structured to convert chemical energy into electrical energy, or vice versa. An electrochemical cell may include a fuel cell, electrolyzer, or both.

"Electrolyzer" as used herein is composed of an electrolyte membrane, an anode layer, and a cathode layer separated from the anode layer by the electrolyte membrane. A catalyst material, such as Pt and Ir catalysts, is included in the anode and cathode layers of the electrolyzer. At the anode layer, $H_2O$ is hydrolyzed to $O_2$ and $H^+$ ($2H_2O \rightarrow O_2 + 4H^+ + 4e^-$). At the cathode layer, $H^+$ combines with electrons to form $H_2$ ($4H^+ + 4e^- \rightarrow 2H_2$). The electrolyte membrane of the electrolyzer may be a polymer electrolyte membrane (PEM).

"Fuel cell" (FC) as used herein is an electrochemical device that converts chemical energy into electrical energy without combustion.

"PEMFC" as used herein is a type of fuel cell that utilizes a Polymer Electrolyte Membrane (PEM) to carry protons between two catalytic electrode layers, thus generating electrical current. A typical single PEM fuel cell is composed of a PEM, an anode layer, a cathode layer, and GDLs. These components form a membrane electrode assembly (MEA), which is surrounded by two flow field plates. A catalyst material, such as platinum (Pt) catalysts, is included in the anode and cathode layers of the PEM fuel cell. At the anode layer, Pt catalysts catalyze a hydrogen oxidation reaction (HOR, $H_2 \rightarrow 2H^+ + 2e^-$), where $H_2$ is oxidized to generate electrons and protons ($H^+$). At the cathode layer, Pt catalysts catalyze an oxygen reduction reaction (ORR, $\frac{1}{2}O_2 + 2H^+ + 2e^- \rightarrow H_2O$), where $O_2$ reacts with $H^+$ and is reduced to form water. A PEM typically operates at temperatures up to 100° C.

"Proton Exchange Membrane" as used herein is also known or referred to as polymer electrolyte membrane (PEM). In one or more embodiments, the PEM membrane comprises a shunt material such as one or more "carbon-containing semiconductors" capable of shunting current under certain environmental conditions and preventing the positive electrode from reaching a high potential.

A "carbon-containing semiconductor" as used herein refers to a carbonaceous polymer that is capable of shunting current under specific environmental conditions. Exemplary carbon-containing semiconductors include polyaniline, polypyrrole, polyfuran, thiophene, polythiophene, polyalkyl thiophene, polyacetylene, poly(9,9-dioctylfluorene-alt-benzothiadiazole, poly(phenylenevinylenes), PEDOT, PEDOT:PSS, linear acenes, metal phthalocyanines, perylene derivatives, tetrathiafulvalenes, benzothiophenes, coronenes, porphyrins, rubrenes, thiophenes, C60, graphene, graphene nanoribbons, purified semiconducting carbon nanotubes, or combinations or derivatives thereof.

"Membrane Electrode Assembly" (MEA) as used herein refers to assembly which normally comprises a polymer membrane with affixed/adjacent electrode layers. In some cases, the MEA may also include gas diffusion layer/materials.

"Microporous layer (MPL) as used herein refers to a porous layer located between the catalyst layer (CL) and gas diffusion layer (GDL). The MPL typically contains a hydrophobic agent, polytetrafluoroethylene (PTFE), and carbon black.

"Catalyst layer" (CL) as used herein refers to the active region for the electrochemical reactions in a fuel cell. An effective catalyst layer should have transport channels for protons, electrons, reactants, and products. The catalyst layer is typically made from a catalyst ink containing catalyst powder, binder and solvents applied to a supporting material. "Electrocatalyst" or "catalyst," as used herein is a metal which is catalytic for fuel cell reactions, typically supported on a catalyst support.

"Supported catalyst" as used herein refers to a catalyst metal dispersed on a support. "Catalyst support" as used herein is a material upon which metal is dispersed, which is typically conductive (e.g., carbon, a conducting polymer, or a metal oxide).

"Electrode," as used herein, is a supported electrocatalyst in contact with or affixed to a membrane. The electrode may include other materials in addition to the electrocatalyst.

"Metal" as used herein refers to precious metal, noble metal, platinum group metal, platinum, alloys, and oxides of same, and compositions that include transition metals and oxides of same. For example, the metal can be platinum, iridium, osmium, rhenium, ruthenium, rhodium, palladium, vanadium, chromium, or a mixture thereof, or an alloy thereof, specifically, the metal can be platinum. As described herein, the metal can also be alloys or metal oxides effective as catalysts. As used herein, a "metal" acts as a catalyst for the reactions occurring in the fuel cell.

"Ionomer," as used herein is an ionically conductive polymer (e.g., Nafion®). An ionomer is also frequently used in the electrode layer to improve ionic conductivity.

"Membrane," 103 as used herein refers to a polymer electrolyte membrane, solid polymer electrolyte, proton exchange membrane, separator, or polymer membrane. The "membrane" is an ionically conductive, dielectric material against which catalytic electrodes are placed or affixed. An exemplary membrane is a sulfonated tetrafluoroethylene-based fluoropolymer-copolymer (e.g., Nafion®), which can be obtained in varying thicknesses, equivalent weights, etc.

"Electrolyte" as used herein is a nonmetallic electric conductor in which current is carried by the movement of ions or a substance that when dissolved in a suitable solvent becomes an ionic conductor. The polymer membrane of a fuel cell can be an electrolyte.

"Oxygen reduction reaction," "cathode reaction," or "cathodic process," as used herein is a reaction in which oxygen gas is reduced in the presence of protons, producing water.

"Hydrogen oxidation reaction," "HOR," "anode reaction," or "anodic process" as used herein is a reaction in which hydrogen gas is converted into protons and electrons.

"Protons," "W," "hydrogen ions," or "positive ions," as used herein refer to a positively charged portion of hydrogen atom which results from reaction over catalyst material.

"Anode" 104 as used herein is the negative electrode where fuel oxidation reaction occurs. "Cathode" 102 as used herein is the positive electrode where oxidant-reduction reaction occurs.

"Gas diffusion layer," "GDL," or "porous backing layer" 101 as used herein refers to a layer adjacent to the electrodes which aides in diffusion of gaseous reactants across the electrode surface; it is typically a carbon cloth or carbon-based/carbon-containing paper (e.g., one manufactured by Toray). The GDL should be electrically conductive to carry electrons through an external circuit. The GDL may be an integral part of the cell, MEA, the flow field, or a combination thereof.

"Bipolar plate" or "BPP" 100 as used herein is the portion of a fuel cell adjacent to the GDL through which electrons pass to an external circuit; it may also contain channels or paths (flow field) to assist in gas distribution and is typically made of graphite or conductive composites. In some embodiments, cooling channels are integrated into the BPP.

"Flow field" as used herein is the scheme for distributing gaseous reactants across the electrode. A flow field may be part of or include a bipolar plate 100 and/or a gas diffusion layer.

"Insulator" or "dielectric" as used herein refers to a material which is not electrically conductive.

"Electrical conductivity" or "electronic conductivity" as used herein refers to the ability of a material to conduct electrons.

"Protonic conductivity" or "ionic conductivity" (IC), as used herein refers to the ability of a material to conduct ions or protons.

"Carbon black" as used herein refers to a conductive aciniform carbon utilized, for example, as a catalyst support.

"Porosity" or "permeability" as used herein refers to macroscopic porosity of an electrode structure (i.e., related to ability of diffusion of gaseous reactants through an electrode layer). "Particulate" as used herein refers to a material of separate particles.

"Polarization curve," "IV curve," or "current-voltage curve," as used herein refers to data/results from electrochemical analysis of MEAs or catalyst materials.

"Current density" as used herein refers to the current flowing per unit electrode area.

An "ionically conductive material" as used herein refers to any material which is effective for the transmitting electrical current. Specifically, the conductive material can be a conducting polymer. For example, perfluorosulfonic acid (PFSA), polyaniline, polypyrrole, polythiophene, polyfuran, poly(p-phenylene-oxide), poly(p-phenylene-sulfide), substituted conducting polymers, or mixtures or derivatives thereof can be used. Specifically, the conducting polymer can include polyaniline, polypyrrole, polyfuran, polythiophene, or mixtures or derivatives thereof. Mixtures of these polymers can include physical mixtures as well as copolymers of the monomers of the respective polymers. As used herein, reference to a polymer also covers a copolymer.

Fuel Cell

A typical polymer-electrolyte-membrane fuel cell (PEMFC) (FIG. 1) comprises one or more membrane electrode assemblies (MEA), backing layers and flow fields/current collectors, fuel feed, and oxidant feed.

Membrane Electrode Assembly (MEA)

The MEA comprises an anode 104, a cathode 102, and a membrane 103. The anode 104 can be an electrode of the present invention. The electrode should be electrically conducting, porous enough to let reactants diffuse to the metal, and able to carry protons to the membrane. The cathode 102 can also be an electrode. Current technology varies with the manufacturer, but total Pt loading of the electrode has decreased from 4 mg/cm$^2$ to about 0.2 mg/cm$^2$. Pt loadings of 0.5 mg/cm$^2$ are capable to generate about 0.5 amperes per mg Pt.

Membrane/electrode (104/103/102) assembly construction varies greatly, but the following is one of the typical procedures. The supported catalyst/electrode material is first prepared in liquid "ink" form by thoroughly mixing together appropriate amounts of supported catalyst (powder of metal, e.g., platinum dispersed on carbon) and a solution of the membrane material (ionomer) dissolved in a solvent, e.g., alcohols. Once the "ink" is prepared, it is applied to the surface of the membrane, e.g., Nafion®, in several different ways. The simplest method involves painting the catalyst "ink" directly onto a dry, solid piece of membrane. The wet supported catalyst layer and the membrane are heated until the catalyst layer is dry. The membrane is then turned over, and the procedure is repeated on the other side. Supported catalyst layers are thus on both sides of the membrane. The dry membrane/electrode assembly is rehydrated by immersing in dilute acid solution to also ensure that the membrane is in the H$^+$ form needed for fuel cell operation. The final step is the thorough rinsing in distilled water. The membrane/electrode assembly can be assembled into the fuel cell hardware.

Addition of the shunt material such as carbon-containing semiconductors to a Nafion® membrane could be accomplished in a number of ways. Without restricting the scope of the invention, semiconducting filaments, particles, or coated beads could be blended into a Nafion® dispersion, e.g., by sonication, above a percolation threshold prior to solvent-casting of a membrane. Alternatively, membranes could be fabricated with controlled porosity, and carbon-containing semiconductors could be solution cast, or chemically or electrochemically deposited into the pores.

Normal Nafion® will dehydrate (thus lose proton conductivity) when temperature is above ~80° C. This limitation can be problematic for fuel cells because higher temperatures are desirable for a better efficiency and CO tolerance of the platinum catalyst. Silica and zirconium phosphate can be incorporated into Nafion® water channels through in situ chemical reactions to increase the working temperature to above 100° C.

The membrane/electrode assembly can have a total thickness of about 50 (excluding gas diffusion and microporous layers), for example, and conventionally generate more than 0.5 ampere of current for every square cm of membrane/electrode assembly at a voltage between the cathode and anode of 0.7 V, when encased within well engineered components. For example, the membrane is about 15-20 µm and the anode and cathode conductive layers are about 10 µm each. This provides a membrane/electrode assembly of about 40 The gas diffusion layer and microporous layer may be about 300 µm. A five-layer MEA is typically about 640

Gas Diffusion Layers

The fuel cell can include gas diffusion layers. The layers are generally one next to the anode and another next to the cathode and made of a porous carbon paper or carbon cloth. The layers are made of a material that can conduct the electrons exiting the anode and entering the cathode.

Bipolar Plate/Flow Fields/Current Collectors

The fuel cell can include flow fields and current collectors 100. Pressed against the outer surface of each backing layer can be a piece of hardware, called a bipolar plate 100, which often serves the dual role of flow field and current collector. The plates are generally made of a lightweight, strong, gas impermeable, electron-conducting material; graphite, metals, or composite plates are commonly used.

The bipolar plates can provide a gas flow field such as channels machined into the plate. The channels carry the reactant gas from the point at which it enters the fuel cell to the point at which the gas exits. The pattern, width, and depth have a large impact on the effectiveness of the distribution of the gases evenly across the active area of the membrane/electrode assembly. The flow field also affects water supply to the membrane and water removal from the cathode.

The bipolar plates can also serve as current collectors. Electrons produced by the oxidation of hydrogen can be conducted through the anode, through the backing layer and through the plate before they can exit the cell, travel through an external circuit, and re-enter the cell at the cathode plate. Typically, many cells are stacked together to provide a higher voltage and the internal bipolar plates transport electrons from one cell to the next.

Transfer Membrane/Electrolyte

The polymer electrolyte membrane (PEM) 103 (or proton exchange membrane), carries the necessary protons from the anode 104 to the cathode 102 while keeping the gases ($H_2/O_{02}$) safely separate. The thickness of the membrane in a membrane/electrode assembly can vary with the type of membrane. The thickness of the supported catalyst layers depends on how much metal is used in each electrode. For example, for supported catalyst layers containing about 0.15 mg $Pt/cm^2$, the thickness of the supported catalyst layer can be about 10 µm to about 20 The thickness of the supported catalyst layer can be, for example, about 0.1 to about 50 more specifically on the order of about 20 to about 30 µm. Thicknesses above 50 µm appear to increase the mass transfer problems too much to be effective.

The membrane of the MEA 103 may include a dielectric, ionically conductive material. It is desired that the membrane be sufficiently durable to withstand conditions within an electrochemical cell such as a fuel cell or an electrolyzer. The membrane of the MEA may include an ionomer, specifically a perfluoro sulfonate ionomer or a sulfonated or phosphorylated polybenzimidazole ionomer. More specifically, the membrane may include a sulfonated tetrafluoroethylene copolymer cation exchange ionomer such as Nafion® (Chemours). Nafion® is a perfluorinated polymer (PFSA) that contains small proportions of sulfonic or carboxylic ionic functional groups (e.g., tetrafluoroethyleneperfluoro-3,6-dioxa-4-methyl-7-octenesulfonic acid copolymer).

In one or more embodiments described herein, the MEA membrane may further include a shunt material. The shunt material may include one or more semiconductor materials, carbon-containing semiconductors, or electroactive polymers capable of or structured to shunt current under certain environmental conditions, prevent the positive electrode from reaching a high potential, or both.

In one embodiment, the shunt material or carbon-containing semiconductor may include polyaniline, polypyrrole, polyfuran, thiophene, polythiophene, polyalkyl thiophene, polyacetylene, poly(9,9-dioctylfluorene-alt-benzothiadiazole, poly(phenylenevinylenes), PEDOT, PEDOT:PSS, linear acenes, metal phthalocyanines, perylene derivatives, tetrathiafulvalenes, benzothiophenes, coronenes, porphyrins, rubrenes, thiophenes, C60, graphene, graphene nanoribbons, purified semiconducting carbon nanotubes, or combinations or derivatives thereof. In another aspect, the carbon-containing semiconductor may include a semiconducting network of mixed-chirality carbon nanotubes. In another aspect, the carbon-containing semiconductor may include a thiophene, polythiophene, or poly-alkyl-thiophene, or their combination.

In at least one embodiment described herein, the MEA membrane may include one or more carbon-containing semiconductors at a volume percentage of about 0% to about 50% by volume of the membrane. In one aspect the volume percentage of the one or more carbon-containing semiconductors is about 5% to about 50%, based on the total volume of the membrane. In another aspect, the volume percentage of the one or more carbon-containing semiconductors is about 0% to about 2%, about 1% to about 5%, about 5% to about 10%, about 10% to about 20%, about 20% to about 30%, about 30% to about 40%, about 40% to about 50%, about 1% to about 20%, about 5% to about 30%, about 10% to about 40%, about 20% to about 50%, about 30% to about 50%, about 1% to about 25%, or about 25% to about 50%, by volume of the membrane.

In one or more embodiments, the MEA membrane may include the shunt material distributed substantially uniformly, evenly, regularly, symmetrically throughout the membrane's surface or area.

In another exemplary embodiment, the shunt material may be distributed randomly, unevenly, and/or asymmetrically. The MEA membrane may include different volume percentages in particular regions of the membrane (or layers thereof). In a non-limiting example, one or more regions of the membrane near the inlet or outlet may contain greater volume percentages of the one or more shunt materials (such as carbon-containing semiconductors) than other regions of the membrane. This would permit shunting in regions of the membrane most likely to experience higher potentials. The shunt material may be included within the membrane in various ways. Firstly, the shunt material may be included in a mixture or blend of the shunt material and the ionically conductive polymer of the membrane. The ionically conductive polymer may be replaced by another electron donor material. The blend may be uniform or uniformly applied across the entire area of the membrane or be concentrated in one or more portions of the membrane. The distributed or applied blend may be non-uniform such that at least one portion of the MEA includes a different volume percentage of the shunt material than at least one other portion of the MEA.

Secondly, the shunt material may be included as one or more islands, inclusions, discrete areas, pockets, or the like. The discrete areas or islands may include a blend of the shunt material and the ionically conductive material. Alternatively, the discrete areas or islands may include the shunt material only. The shunt material may be thus included as pure material free of the ionically conductive polymer in one or more portions of the membrane.

Described herein is a means of reducing high anodic overpotential at the positive electrode and limiting the rate of carbon consumption and/or Pt oxidation by effectively shorting the membrane with an electronic conductor. Ideally this conductive mechanism is activated only under deleterious conditions such as when the local potential of the positive electrode is greater than under normal operating conditions.

The electrochemical cell incorporates a shunt into the membrane separator that becomes electronically conductive at a particular anodic onset potential, thereby preventing excessive anodic potentials at the positive electrode that would otherwise drive deleterious parasitic reactions such as catalyst dissolution or catalyst and carbon oxidation.

Polythiophenes are electroactive polymers that become electronically conductive when doped. In particular, p-doped polythiophenes can be generated when they are in contact with an electrode at high potential. When polythiophenes are integrated into the membrane and the positive electrode locally experiences a high potential excursion (e.g., due to the above-described phenomenon), the polythiophene may become activated (i.e., p-doped) and thereby electronically conductive. Once there is a continuous electronic pathway established between the two electrodes, the p-doped polythiophene has a mediating effect on the locally high positive electrode potential by allowing electrons to be shunted from the negative electrode to the positive electrode. This process is reversible; that is, when the potential drops again (e.g., by drawing sufficient current across the cell), the polythiophene doping level will decrease and the electronic conductivity will drop such that the membrane again becomes relatively insulating.

In particular, polythiophenes that react in a particular voltage window are desirable such that they are activated above the normal operating potential of the positive electrode but below the potential at which carbon corrosion, catalyst dissolution, or other degradation mechanisms occur at an unacceptable rate.

There is evidence that thiophenes are stable in Nafion® sulfonated tetrafluoroethylene-based fluoropolymer-copolymer membranes. See Tazi and Savadogo, Electrochemica Acta 45(25-26): 4326-4339 (2000). Polythiophenes can also be incorporated into Nafion® or similar proton-conducting membranes used in PEMFCs.

One embodiment described herein is a polymer-electrolyte-membrane fuel cell (PEMFC) system comprising: a fuel source, an oxidation source, a positive electrode exposed to an electrolyte membrane, a negative electrode exposed to the electrolyte membrane; and one or more electrolyte membranes being positioned between the positive electrode and the negative electrode; wherein the electrolytic membrane comprises the shunt material having one or more carbon-containing semiconductors that become electronically conductive at a specific shunting onset potential. While a PEMFC example is given, the membrane including the shunt material is envisioned for an electrolyzer as well.

In some embodiments a "bilayer" membrane is used as the separator, in which the layer adjacent to the positive electrode includes a carbon-containing semiconductor that becomes conductive above a potential $V_1$, and the layer adjacent to the negative electrode includes a carbon-containing semiconductor that becomes conductive above a potential $V_2$, with $V_1 > V_2$. This is advantageous when the polymer adjacent to the positive electrode is unstable at the potential of the negative electrode, or if the polymer adjacent to the negative electrode is unstable at the potential of the positive electrode.

In some embodiments, one, two, three or more layers are used that include the shunt material such as the carbon-containing semiconductors that become electronically conductive in different potential windows such that all polymers are stable during normal operation of the cell and when the shunt is activated via excessive anodic potential at the positive electrode. In another embodiment, the layers have the same or different volume percentages of the one or more carbon-containing semiconductors. These semiconductors can have overlapping potential windows, the same potential window, or different potential window. In another aspect, the outer layers may have increased volume percentages of the carbon-containing semiconductors and the inner layers may have no or decreased volume percentages of the carbon-containing semiconductors. In one aspect membrane regions localized in proximity to the inlet or outlet may contain greater volume percentages of the carbon-containing semiconductors than other regions of the membrane or other membrane layers.

In some embodiments, the carbon-containing semiconductor becomes electronically conductive at a potential below the open-circuit potential of the cell. This can be advantageous because even the open circuit potential may be high enough to drive degradation reactions at the positive electrode. In this configuration, the fuel cell stack behaves as an electronic resistor when current is not applied (or when a sufficiently low current is applied), and the positive electrode potential of each cell is allowed to exceed the redox potential of the shunt.

The shunt material or carbon-containing semiconductor material or electroactive polymer(s) may be deployed at one or more specific locations in the cell and/or stack. Implementing this could improve overall performance and durability but must be balanced against the higher cost of introducing a gradient in the manufacturing process. In a non-limiting example, membranes with a gradient in thiophene concentration are useful, with less at the inlet and more at the outlet (where the risk of $H_2$ starvation is likely higher). Micro-diffraction experiments have shown that the regions close to the outlet of the flow field show more significant Pt size growth, possibly indicating higher potential excursions at the positive electrode in these regions that may be related to $H_2$ starvation. In other systems, $H_2$ starvation may occur close to the inlet.

In a non-limiting example, the shunt material may be included in one or more regions or locations of the MEA, MEA membrane, or both. In these regions or locations, the shunt material may be included in a higher concentration within the blend of the ionically conductive polymer and the shunt material than in other areas of the membrane, at least one other region of the membrane, or the remainder of the membrane. The inclusion of the shunt material within the MEA, MEA membrane may be limited to these region(s) or location(s) such that the remainder or the membrane is substantially or entirely free of the shunt material. As a result, the MEA, MEA membrane may include one or more shunt-free regions and one or more shunt regions, the shunt regions including the shunt material in one or more forms.

The membrane may include one or more first regions and second regions. The second regions may include the shunt material. The first regions may be shunt material free or include the shunt material in a lower concentration than the second regions. The second regions may include a higher concentration or elevated amounts/volumes of the shunt material. The second regions may be the shunt regions.

The shunt region(s) may include the shunt material pockets, islands, or discrete areas which may be free of the ionically conductive material, or which may include a blend of the shunt material with the ionically conductive material.

The shunt region(s) may be structured symmetrically, each island including the same volume or weight percentage of the shunt material. Alternatively, the placement and concentration of the shunt material within the shunt region(s) may be random.

The shunt region(s) may extend from the cathode to the anode or an entire width of the membrane between the electrodes.

Furthermore, the one or more shunt regions may include an area structured to have higher ionic conductivity than other regions within the cell, MEA, and/or membrane. Such region may be structured to tolerate a lower concentration of the ionically conductive material or a proton conductor and thus a higher concentration of the shunt material.

The one or more shunt regions may include one or more areas of the MEA, membrane, or both which have increased, elevated, or higher moisture content (during operation of the cell) than other areas of the membrane. Increased moisture content may impart higher proton conductivity through the membrane.

The one or more shunt regions or locations may include an area within the MEA, MEA membrane, or both. The shunt regions or locations may include an area adjacent to, in vicinity of, or aligned with an exit of the cathode flow field. The cathode flow field may include the bipolar plate, GDL or both. Due to water generation in the cathode during operation of the cell, the membrane tends to be wetter near the exit of the cathode flow field, as opposed to the entrance. In this location, the shunt material may be in proximity, close proximity, or be adjacent to the exit of the cathode flow field. The cathode flow field exit is shown schematically in FIG. 1 as 120. The cathode flow field exit may be in the area of the flow field where the excess air, $O_2$, water ($H_2O$) exit the cathode flow field. The area of the membrane closest to the cathode flow field exit may include the shunt material as described herein.

Figure 4A:
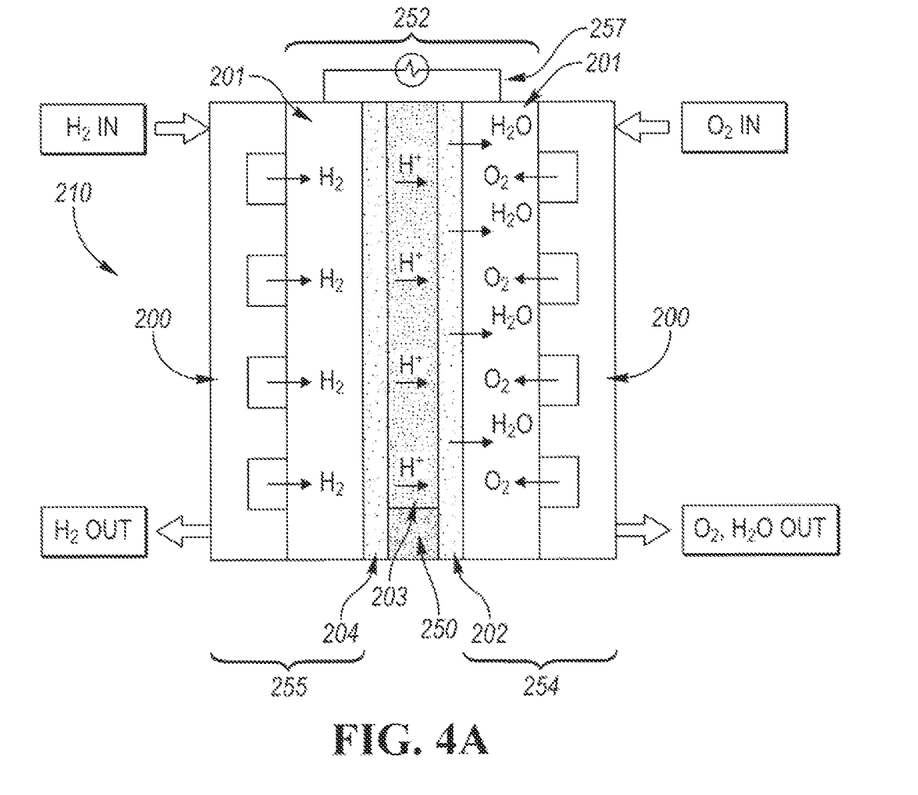
FIGS. 4A, 5A, and 6A show schematic cross-sections of electrochemical cells including the shunt material regions in the membrane.

FIG. 4A depicts a non-limiting example of an electrochemical cell 210 including the shunt material 250 in a MEA membrane 203. The cell 210 includes the MEA 252 having a membrane 203, anode 204, cathode 202, GDL 201 adjacent to each electrode, and BPP 200 adjacent each GDL. Each BPP 200 includes a flow field (cathode) 254 or (anode) 255. The cell (or stack of such cells) further includes an external circuit 257. While the shunt material region 250 in FIG. 4A is shown as a limited area between the cathode 202 and anode 204, it is for illustrative purposes only to indicate the possible location. The shunt material may be incorporated as a gradient, discrete material, islands, etc. as described herein within the generally shown location or region.

Figure 4B:
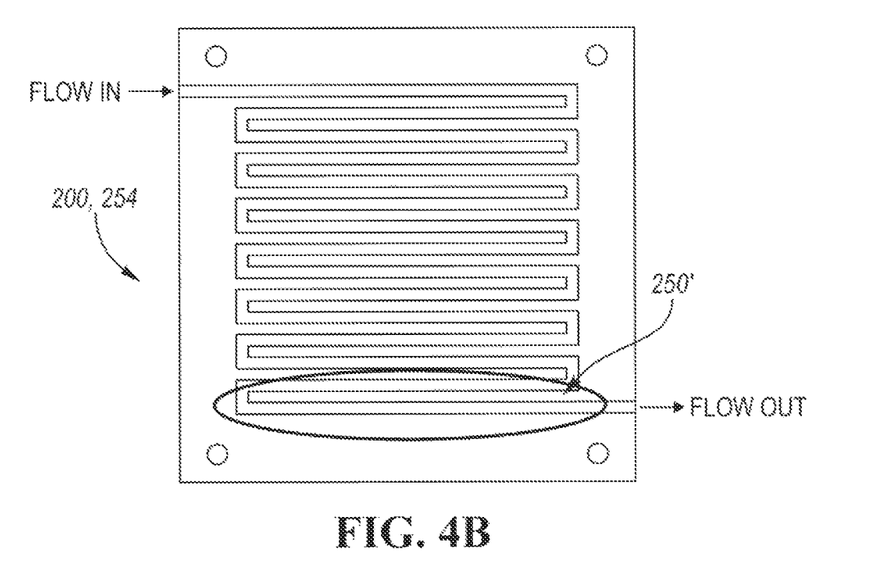
FIGS. 4B, 5B, and 6B are schematic depictions of flow fields showing flow field regions corresponding to the shunt material regions within the membrane.

The location of the shunt material is further schematically illustrated in FIG. 4B. FIG. 4B is a non-limiting example of a BPP 200 with a cathode flow field 254. The entrance (flow in), exit (flow out), and direction of flow in the flow field are marked with arrows. The area of the BPP and the flow field which would be aligned with the shunt material in the MEA or MEA membrane is marked as 250'. The entire area or a portion of the marked area may include the shunt material. To further specify, FIG. 4B does not depict the shunt material location/region itself but rather a location within the flow field which corresponds to the shunt material location in the membrane. The same is true for FIGS. 5B and 6B.

In addition, or alternatively, the one or more shunt regions or locations may include one or more land regions of the cathode flow field. The land regions may be rib regions or landings of the BPP. The land regions may include regions of the BPP which are in contact with the MEA, GDL, or both. The shunt material may be included adjacent to, in the vicinity of, around, aligned with, facing, and/or under one or more land regions, landings, or ribs. For example, the shunt material may be included under or facing each rib or land region. Alternatively, the shunt material may be included facing every other rib or land region of the cathode flow field. The inclusion of the shunt material in this location may be structured into a pattern. The shunt material may be included along a portion of a land region or under the entire width of the land region. The cathode under the land regions tends to be wetter or have increased moisture content.

Non-limiting example of the land regions or ribs is shown in FIG. 1 as 130. One or more channel regions or regions under the channel 132 of the cathode flow field may be free from the shunt material or be shunt-material free.

Figure 5A:
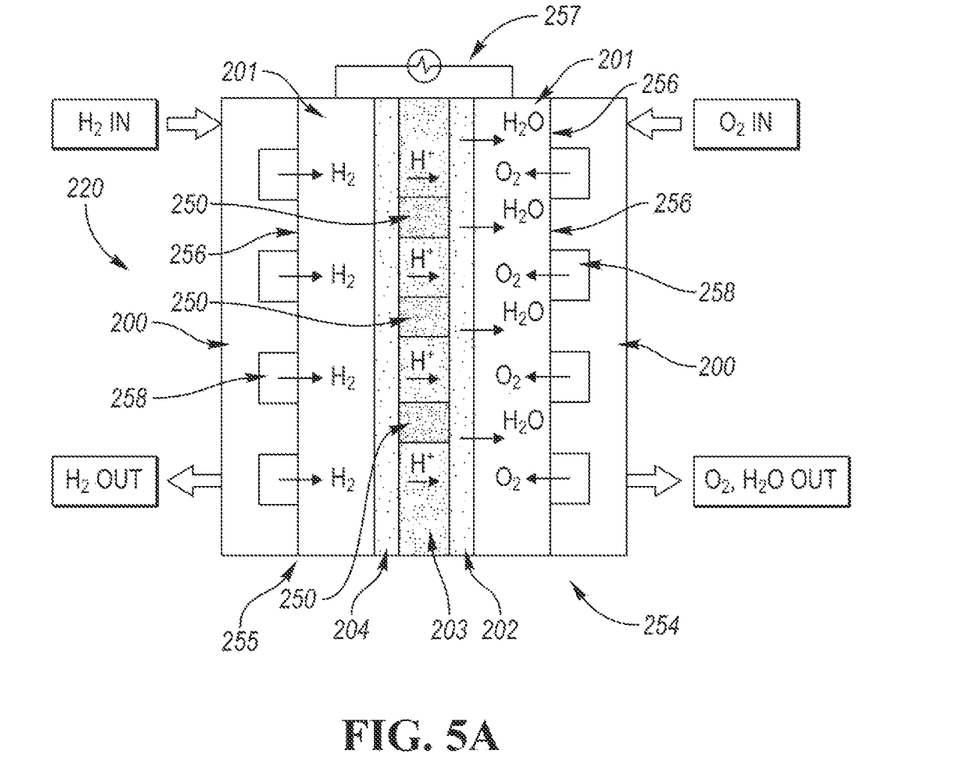

FIG. 5A schematically shows an electrochemical cell 220. The cell 220 includes BPPs 200 and flow fields 254, 255 having the land regions, ribs, or landings 256 and channels 258. For illustrative purposes, the shunt region 250 is shown in a location proximate to or under the location of land regions 256. The area in proximity or under the channels 258 is shunt-material free.

Figure 5B:
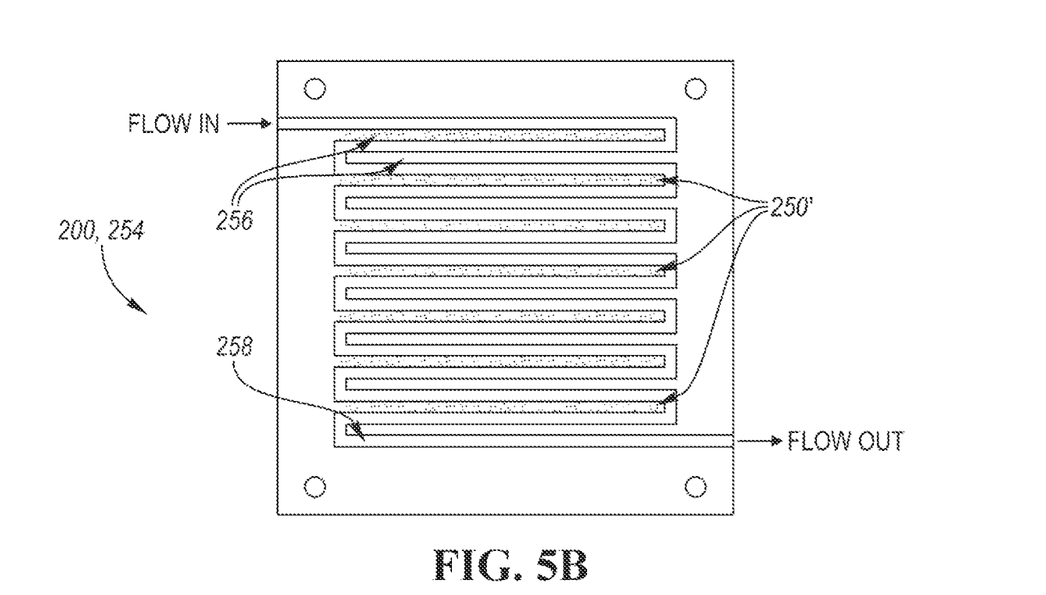

An alternative depiction of the shunt material location is shown in FIG. 5B. The depicted example of a BPP 200 and the cathode flow field 254 includes the channel 258 and land regions 256. In the non-limiting example shown in FIG. 5B, every other land region includes areas 250' with which the shunt material in the membrane would be aligned or facing. As was mentioned above, different arrangements of the shunt material are envisioned such that the shunt material may be facing every land region, every other land region, every third land region, or the like.

Alternatively, or in addition, the shunt material may be included in an area adjacent to, in proximity, in close proximity to, or aligned with the exit and/or entrance of the anode flow field 255. In some embodiments, the shunt material may be included facing anode land regions if they coincide with the cathode land regions.

Figure 6A:
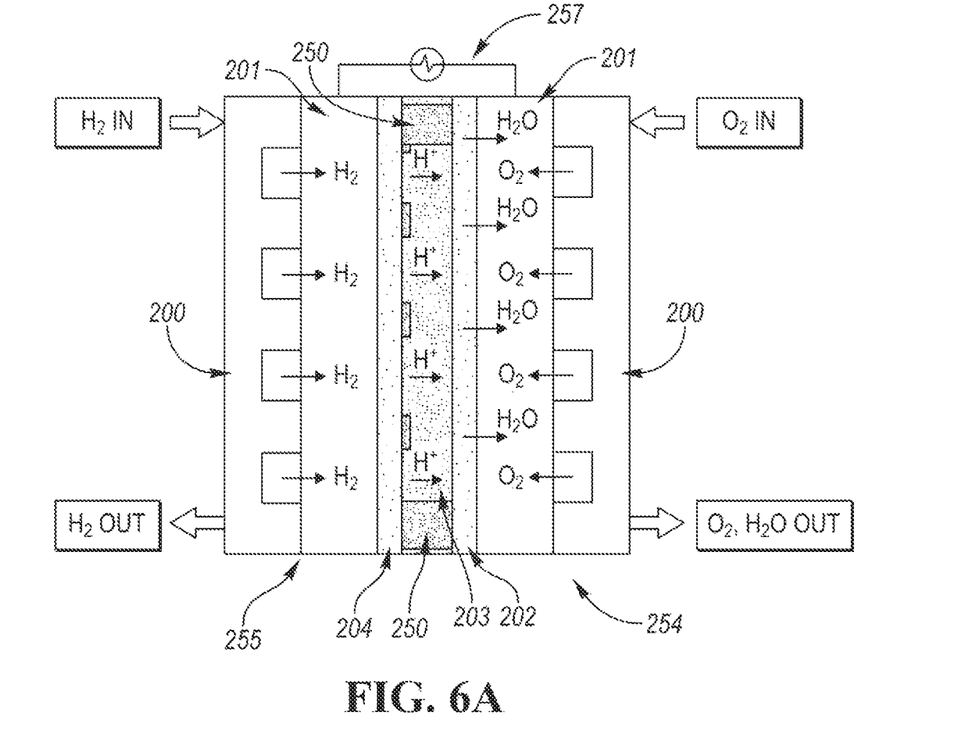

A non-limiting example of a cell 230 having the shunt material 250 incorporated in the proximity of the entrance of the anode flow field 255 is shown in FIG. 6A. The same system is shown also having the shunt material 250 incorporated aligned with or facing the exit of the anode flow field 255. The exit of the anode flow field may experience local $H_2$ starvation with a higher probability than other regions of the anode flow field. The anode catalyst layer 204 may have a relatively high liquid content in the same region. Because water generated at the cathode can diffuse through the membrane 203 to the anode side 204, a desirable location for the shunt material/region may be where the water content is highest, which may correspond to the anode flow field exit.

Figure 6B:
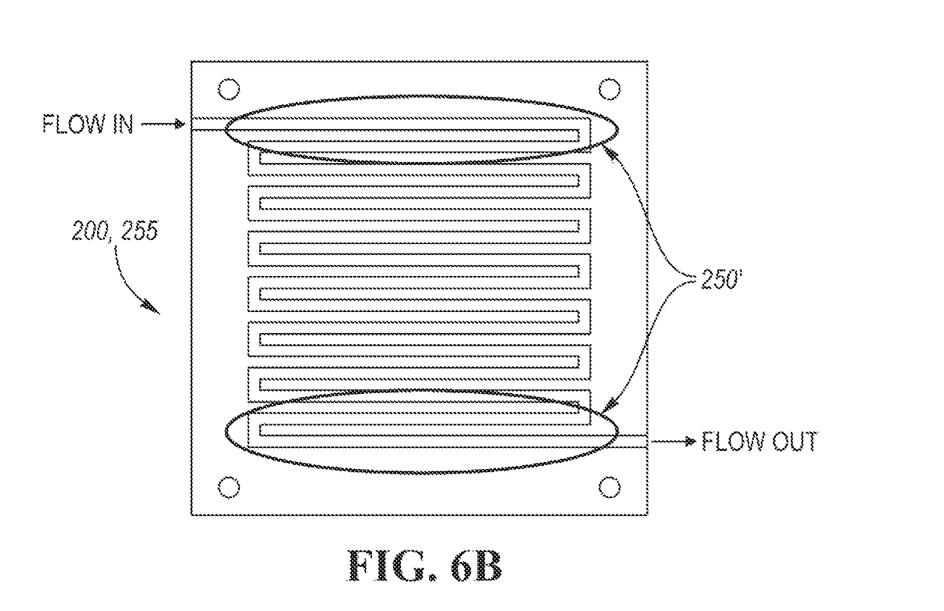

A further depiction of the anode flow field 255 and the BPP 200 is shown in FIG. 6B. The locations 250' at the entrance and/or exit of the anode flow field 255 correspond to the locations/regions on the membrane where the shunt material may be located.

Yet, the system may include the shunt material in just one location such as either by the entrance of the anode flow field or being aligned with the exit of the anode flow field. Alternatively, a combination of these locations may include the shunt material.

Additionally, during startup when air is present in the anode flow channels, a $H_2$/air front moves from the entrance of the anode flow field to the exit. Hence, the flow field exit may experience conditions conducive to C corrosion for a longer period of time than the entrance or middle sections of the flow field. A desirable location for the shunt material/region may be near the anode exit location.

Moreover, during shutdown, if air is coming into the anode flow field and creating an Hz/air front (although typically a $N_2$ purge may be implemented to avoid the front creation), C corrosion may occur near the anode entrance. Including the shunt material aligned with the anode entrance may be thus desirable.

Various factors may influence the placement of the shunt material. As was discussed above, several of the factors include water accumulation, moisture content, C corrosion, $H_2$ starvation. Additional factors may include placement of the shunt material within the cell such as cell configuration: co-flow, counter flow, or cross flow.

In a co-flow system, the anode and cathode flow field entrances are located near each other, and the overall flow is primarily in the same direction toward exits located near each other. The shunt material/region may be thus located in the vicinity of the flow field exits, the regions of which overlap, under the cathode flow field land region(s), or both.

In a counterflow system, the anode and cathode streams flow in opposite directions. The shunt material/region may be placed in the vicinity of both the cathode and anode flow field exits, under the cathode flow field land region(s), or both.

In a cross flow system, the flow directions are orthogonal. The shunt material/region may be placed in the vicinity of the overlapping cathode and anode exits, specifically in a corner of the cell with the overlapping exits, under the cathode flow field land region(s), or both.

In some aspects, a bilayer or multiple membrane layers are used that include electroactive polymers that become electronically conductive in different potential windows such that all polymers are stable during normal operation of the cell and when the shunt is activated via excessive anodic potential at the positive electrode. This can be advantageous because even the open circuit potential may be high enough to drive degradation reactions at the positive electrode. In this configuration the fuel cell stack behaves as an electronic resistor when current is not applied (or when a sufficiently low current is applied) and the positive electrode potential of each cell can exceed the redox potential of the electroactive polymer.

EXAMPLES

Example 1

The reversible hydrogen electrode (RHE) is described by Equation 1:

$$HE = SHE \times \frac{RT}{F} \times \left[ \ln(a_{H+}) - \frac{1}{2} \times \ln(p_{H_2}) \right]$$

where SHE is the standard hydrogen electrode, defined as 0 V 25° C., 1 atm pressure, and 1 M $H^+$ concentration. Here T=temperature in Kelvin, R=the gas constant (8.314 J/mol–K), F is Faraday's constant (96485 C/mol), $a_{H+}$ is the activity or concentration of protons in the proton-conducting polymer, and $p_{H2}$ is the partial pressure of hydrogen gas at the catalyst-polymer interface or gas-catalyst-polymer triple-phase boundary.

For a fuel cell operating at 80° C., a hydrogen pressure of 2 atm, and proton concentration of 2 M (i.e., pH=~0.3), the potential at the negative electrode of the fuel cell, where $H_2$ gas is oxidized into protons, would be 10.5 mV vs. SHE.

A typical operating potential of the positive electrode would be 0.6 to 0.8 V vs. RHE, or up to ~0.81 V vs. SHE.

The electroactive polymer poly-3-butyl thiophene (P3BT) is oxidized and becomes increasingly conductive in the potential window 3 to 4.1 V vs. Li metal. See Thomas-Alyea et al., *J. Electrochem. Soc.* A509 (2004), which is incorporated by reference herein for such teachings. The reversible Li metal potential is −3.04 V vs. SHE; accordingly, P3BT is reversibly oxidized in the potential window −0.04 to 1.06 V vs. SHE. The conductivity increases as the oxidation state of P3BT increases. Id. For example, at an oxidation state of 0.2, which is reached at a potential of approximately 4.03 V vs. Li, or 0.99 V vs. SHE, the polymer conductivity is between $1 \times 10^{-3}$ and $1 \times 10^{-2}$ S/cm. At the typical operating potential of 0.81 V vs. SHE, the conductivity is below $1 \times 10^{-4}$ S/cm.

Assuming a membrane thickness of 20 µm (typical for PEMFC), about 10% volume fraction of P3BT in the membrane 105, 106, and a tortuosity factor of 2, the electronic membrane resistance would be 4 ohm-$cm^2$ at a conductivity of $1 \times 10^{-2}$ S/cm and 400 ohm–$cm^2$ at a conductivity of $1 \times 10^{-4}$ S/cm.

At the typical operating positive electrode potential of 0.81 V vs. SHE, the membrane 105, 106 is effectively an electronic insulator (vast majority of current is carried by protons). The corresponding membrane electronic resistance in this case is >1000 ohm–$cm^2$. See FIG. 3B. At greater potentials (~0.99 V vs. SHE and above, including at open circuit), the membrane 105, 107 has sufficient electronic conductivity to shunt the cell and prevent the positive electrode from reaching a significantly higher potential, depending upon the current density through the $H_2$-depleted region. The corresponding membrane electronic resistance in this case is ~10 ohm–$cm^2$. See FIG. 3A.

Meyers and Darling show that a current density of <10 mA/$cm^2$ would be sufficient to sustain oxygen reduction at the negative electrode. Meyers and Darling, *J. Electrochem. Soc.* A1432 (2006). Without a shunt, as described herein, the corresponding reaction at the positive electrode may involve carbon corrosion and or oxygen evolution at potentials above 1.5 V vs. SHE. See FIG. 2A (IV). However, with a shunt 105, 107, both oxygen reduction at the negative and oxygen evolution (or carbon corrosion) at the positive can effectively be terminated. See FIG. 3A. Even at 10 mA/$cm^2$, he overpotential associated with a 10 ohm–$cm^2$ shunt is only 100 mV, which limits the potential of the positive electrode below ~1.1 V vs. SHE.

Figure 3A:
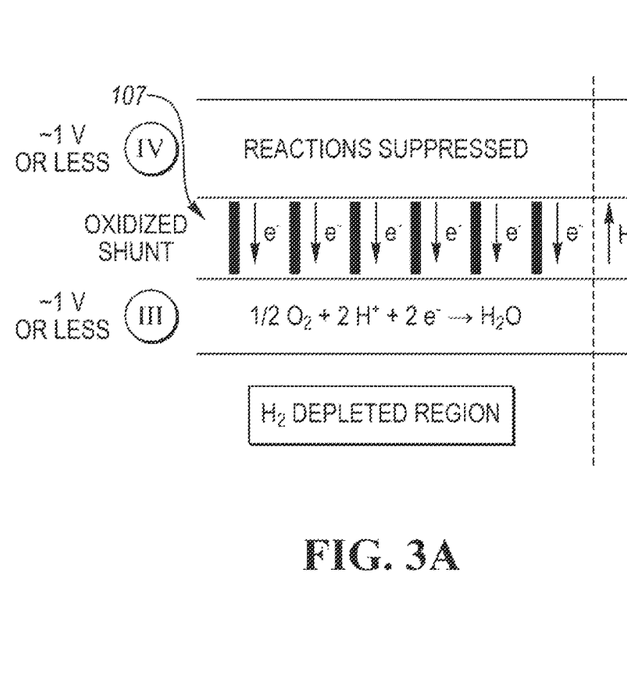
FIG. 3A shows a PEMFC with oxidized shunt in the separator that prevents high potentials at the positive electrode during $H_2$ depletion in part of the negative electrode.

The shunt, once activated (105, 107), effectively deactivates regions of the cell where there is $H_2$ depletion in the flow field adjacent to the negative electrode, which may occur during startup, shutdown, or due to local blockage of the flow field or gas diffusion layer by water droplets. FIG. 3A.

Figure 3B:
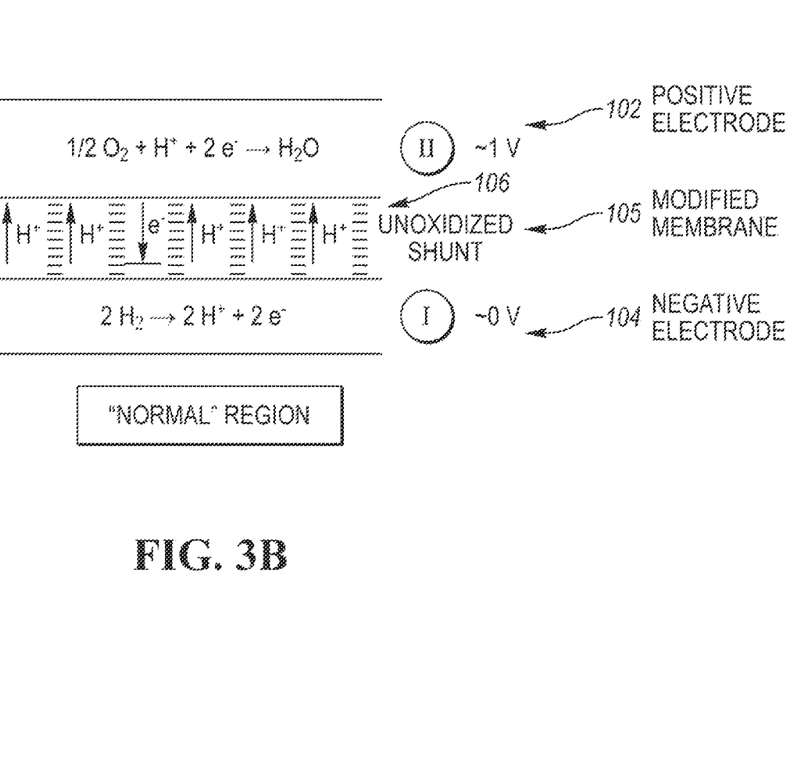
FIG. 3B shows the normal part of the fuel cell with an unoxidized shunt.

The oxidation (e.g., via doping) of the semiconductor (e.g., P3BT) is expected to occur at high potentials in the presence of sulfonyl groups in the proton conducting membrane. Protons of the polysulfonic acid are displaced by positively charged portions of the thiophene (or other electroactive polymer), maintaining an overall electrically neutral membrane. The protons combine with reduced oxygen at the positive electrode to form water. When the potential of the positive electrode drops, the thiophene groups will be reduced and lose their positive charge and the negative charge of the sulfonyl groups will again be balanced by the positive charge of protons generated from $H_2$ gas at the negative electrode. FIG. 3B.

It will be apparent to one of ordinary skill in the relevant art that suitable modifications and adaptations to the compositions, formulations, methods, processes, and applications described herein can be made without departing from the scope of any embodiments or aspects thereof. The compositions and methods provided are exemplary and are not intended to limit the scope of any of the specified embodiments. All the various embodiments, aspects, and options disclosed herein can be combined in any variations or iterations. The scope of the compositions, formulations, methods, and processes described herein include all actual or potential combinations of embodiments, aspects, options, examples, and preferences herein described. The exemplary apparata, designs, compositions, and formulations described herein may omit any component, substitute any component disclosed herein, or include any component disclosed elsewhere herein. Should the meaning of any terms in any of the patents or publications incorporated by reference conflict with the meaning of the terms used in this disclosure, the meanings of the terms or phrases in this disclosure are controlling. Furthermore, the foregoing discussion discloses and describes merely exemplary embodiments. All patents and publications cited herein are incorporated by reference herein for the specific teachings thereof.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention

What is claimed is:

1. An electrochemical cell comprising:
a cathode adjacent to a cathode flow field;
an anode opposite the cathode and adjacent to an anode flow field; and
an electrolyte membrane separating the anode from the cathode, the membrane including a first material that is ionically conductive and a second material that is a shunt material structured to become electronically conductive at a specific shunting onset potential below the cell's open circuit potential, the second material forming one or more shunt regions within the membrane having a higher concentration of the second material than at least one other region of the membrane,
wherein the one or more shunt regions with a higher concentration of the second material include an area having a higher moisture content than at least one other region of the membrane.

2. The electrochemical cell of claim 1, wherein the one or more shunt regions are substantially free of the first material that is ionically conductive.

3. The electrochemical cell of claim 1, wherein the one or more shunt regions include an area aligned with exit of the cathode flow field.

4. The electrochemical cell of claim 1, wherein the one or more shunt regions include an area facing/aligned with one or more landing regions of the cathode flow field.

5. The electrochemical cell of claim 1, wherein the one or more shunt regions include an area aligned with an anode flow field entrance, exit, or both.

6. The electrochemical cell of claim 1, wherein the one or more shunt regions include discrete islands of the second material surrounded by the first material.

7. The electrochemical cell of claim 1, wherein the specific shunting onset potential is greater than about 0.9 V vs. a standard hydrogen electrode (SHE).

8. The electrochemical cell of claim 1, wherein the second material includes polythiophene.

9. The electrochemical cell of claim 1, wherein the first material includes perfluorosulfonic acid.

10. An electrochemical cell comprising:
a cathode adjacent to a cathode flow field;
an anode opposite the cathode and adjacent to an anode flow field; and
an electrolyte membrane separating the anode from the cathode, the membrane including a first material that is ionically conductive and a second material that is a shunt material structured to become electronically conductive at a specific shunting onset potential below the cell's open circuit potential, the second material forming one or more shunt regions within the membrane having a higher concentration of the second material than at least one other region of the membrane,
wherein the one or more shunt regions include an area aligned with exit of the cathode flow field.

11. The electrochemical cell of claim 10, wherein the one or more shunt regions are substantially free of the first material that is ionically conductive.

12. The electrochemical cell of claim 10, wherein the one or more shunt regions include an area aligned with the anode flow field entrance, exit, or both.

13. The electrochemical cell of claim 10, wherein the one or more shunt regions include discrete islands of the second material surrounded by the first material.

14. The electrochemical cell of claim 10, wherein the specific shunting onset potential is greater than about 0.9 V vs. a standard hydrogen electrode (SHE).

15. The electrochemical cell of claim 10, wherein the second material includes one or more carbon-containing semiconductors.

16. An electrochemical cell comprising:
a cathode adjacent to a cathode flow field;
an anode opposite the cathode and adjacent to an anode flow field; and
an electrolyte membrane separating the anode from the cathode, the membrane including a first material that is ionically conductive and a second material that is a shunt material structured to become electronically conductive at a specific shunting onset potential below the cell's open circuit potential, the second material forming one or more shunt regions within the membrane having a higher concentration of the second material than at least one other region of the membrane,
wherein the one or more shunt regions include an area facing/aligned with one or more landing regions of the cathode flow field.

17. The electrochemical cell of claim 16, wherein the one or more shunt regions are substantially free of the first material that is ionically conductive.

18. The electrochemical cell of claim 16, wherein the one or more shunt regions include an area aligned with an anode flow field entrance, exit, or both.

19. The electrochemical cell of claim 16, wherein the one or more shunt regions include discrete islands of the second material surrounded by the first material.

20. The electrochemical cell of claim 16, wherein the second material includes one or more carbon-containing semiconductors.

* * * * *